Patented Aug. 3, 1954

2,685,579

UNITED STATES PATENT OFFICE 2,685,579

FRACTIONATION OF DEXTRANS WITH ALKALINE EARTH HYDROXIDES

Ernest L. Wimmer, Springfield, Pa., assignor to The American Sugar Refining Company, New York, N. Y., a corporation of New Jersey No Drawing. Application May 14, 1951,
Serial No. 226,275

17 Claims. (Cl. 260—209)

This invention relates to the fractionation of dextrans and the separation of a mixture of dextrans of various molecular sizes into smaller fractions of less divergence in molecular size.

There is active interest at the present time in the use of various dextrans, and particularly of partially degraded dextrans, as blood plasma substitutes for intravenous use and as an aid in other phases of the program for the storage of blood and blood derivatives for medical purposes. The molecular size of the dextran for each application is very specific, and it is important that the diversity of molecular sizes in the dextran product for any particular application should be limited.

Thus, raw dextran, as it is isolated from the fermentation beer, generally is of very high mean molecular weight and possesses an intrinsic viscosity, of 0.7 to 0.9. Dextran which is suitable as a blood plasma substitute has an intrinsic viscosity of about 0.24 to 0.25. Dextran of intrinsic viscosity of 0.4 is known to be suitable for the in vitro separation of red and white blood cells by its sedimenting action on the red blood cells. When applied intravenously, dextran with an intrinsic viscosity below 0.2 is rapidly excreted by the kidney function; and dextran begins to exert an accelerating effect upon the sedimentation of red blood cells at an intrinsic viscosity of 0.3.

The partial depolymerization of raw dextran by a mild acid hydrolytic treatment to produce partially degraded dextrans suitable for therapeutic purposes is described in U. S. Patent 2,437,518, with separation of the resulting dextrans from solution by precipitation with alcohol.

The present invention provides an improved process for the fractionation of a mixture of dextrans which is particularly valuable for the fractionation of partially degraded dextrans such as are obtained by mild acid hydrolysis of raw dextran.

In my prior application Serial No. 201,497, filed December 18, 1950, I have described an improved process for the isolation of dextran from fermentation media as alkaline earth metal hydroxide-dextran complexes, and treatment of such complexes with acids which form insoluble alkaline earth metal salts to set free the dextran. The dextran so produced is advantageously used as the dextran to be hydrolyzed and fractionated by the process of the present invention. The present application is a continuation in part of said prior application.

The present invention is based upon the discovery that mixtures of dextrans, and particularly mixtures of partially degraded dextrans, form insoluble complexes with alkaline earth metal hydroxides which differ materially from each other in solubility at any given pH value and alkaline earth metal ion concentration and that different dextran fractions can be separated from each other by taking advantage of such differential solubility and stability.

I have found that the partially degraded dextrans can be completely precipitated as alkaline earth hydroxide complexes, advantageously calcium hydroxide or lime complexes, and that, when the precipitated complexes are carefully and partially acidified, the dextran of higher molecular weight is preferentially dissolved and can be removed from the remaining precipitate and that, by further careful regulation of the addition of acid, successive fractions of diminishing molecular size can be obtained in solution.

I have also found that when such a partially degraded dextran product is selectively and partially reacted with an alkaline earth metal hydroxide, the dextran fractions of lower molecular weight precipitate first as insoluble complexes and can be separated from the other fractions remaining in solution, which can be further fractionated by subsequent and successive addition of alkaline earth hydroxides and formation of insoluble complexes.

In contrast with the precipitating action of alcohols upon dextran solutions, where the higher molecular weight dextrans are precipitated first and the lower molecular weight dextrans remain in solution, the process of the present invention is one in which the lower molecular weight dextran fractions are selectively precipitated as alkaline earth metal hydroxide complexes, and the higher molecular weight dextran fractions are precipitated later; and, when the dextran fractions are completely precipitated as alkaline earth hydroxide complexes, it is the higher molecular weight dextran fractions which are first dissolved by fractional acidification to remove the alkaline earth hydroxide from such complexes.

Where the dextran fractions are successively and fractionally precipitated as alkaline earth hydroxide complexes, the dextran can be recovered from the complexes by treatment with acid to set free the dextran, advantageously using an acid which forms an insoluble precipitate with the alkaline earth metal. The resulting solution of the dextran fraction can then be further purified to remove remaining inorganic salts by dialysis or by ion exchange resin treatment.

When the dextrans are completely precipitated as alkaline earth hydroxide complexes, and are selectively dissolved by successive treatments with acid, the solutions successively obtained are treated with additional acid to ensure complete removal of the alkaline earth metals from the complexes, and the dextran can then be recovered from the solution.

While the present method of fractionation of dextrans is applicable to dextrans of high molecular weight, such as mixtures of raw or unhydrolyzed dextrans, it is particularly advantageous for the fractionation of partially degraded dextran, and will be more particularly described in connection therewith.

The partial degradation or depolymerization of the raw dextran is accomplished by treating a solution of the raw dextran with acid and with regulation of the time of heating, quantity of acid, and temperature of the reaction, to give the desired degree of partial dextran hydrolysis, as described, for example, in U. S. Patent 2,437,518.

One advantageous method of carrying out the process is to precipitate the partially degraded dextrans substantially completely in the form of alkaline earth metal hydroxide complexes. The dextrans may be precipitated by adding a concentrated slurry or solution of the alkaline earth hydroxide. Calcium, barium, or strontium hydroxide may be employed; but calcium hydroxide is particularly advantageous and the lime-dextran complexes are readily handled. The calcium hydroxide dextran compounds are pure white voluminous precipitates which are readily removed from suspension by centrifugation or filtration. Because of the low solubility of certain of the alkaline earth hydroxides, particularly calcium hydroxide, it is more advantageous to produce the calcium hydroxide in the dextran solution by the interaction of a soluble calcium salt, such as the chloride, nitrate or acetate, and a soluble base such as sodium, potassium or ammonium hydroxide. It is advantageous to add the entire amount of alkaline earth salt initially and then add the alkali solution slowly until complete alkaline earth hydroxide-dextran precipitation of the complexes has taken place.

The amount of alkaline earth hydroxide required for the complete precipitation of the dextrans from solution is approximately the molar equivalent of the anhydroglucose units present in the solution, one mol of alkaline earth hydroxide for each anhydroglucose unit. Larger amounts of alkaline earth hydroxide may be employed to ensure complete recovery of the dextrans.

The minimum pH value for the substantially complete precipitation of the dextran complexes is around 12.5. The precipitated dextran complexes are advantageously washed with saturated lime water in order to remove impurities adsorbed by the voluminous precipitate, before subjecting the precipitate to fractionation.

Fractional separation of the precipitated alkaline earth hydroxide-dextran complexes according to the molecular size of the dextrans is attained by the addition of an amount of acid to an aqueous slurry of the precipitate sufficient to liberate into solution a portion of the dextrans, leaving the remainder of the dextrans in the precipitate; and by separating the resulting solution. By adding a further amount of acid, a further fraction of the dextrans is liberated into solution by the acid and can be similarly separated, until the final addition of acid dissolves the last fraction of precipitate.

The dextran which is thus liberated into solution, in the successive fractions, is contaminated by the alkaline earth salt of the liberating acid, and separation of the dextran from the salt must eventually be made. To minimize the problem of this purification step, it is advantageous to employ an acid which produces an insoluble alkaline earth salt when added to the alkaline earth hydroxide-dextran complex. Acids such as sulphuric, carbonic, sulphurous, phosphoric, and oxalic can thus be used, depending somewhat upon the alkaline earth hydroxide in the complex.

The pH value of the suspension decreases somewhat with the successive acid additions, e. g., from around 12.8 to around 12.1. To ensure substantially complete removal of the alkaline earth ions from the solutions, they are further acidified to a pH value of around 6.5, advantageously with an acid which forms an insoluble alkaline earth salt. And the resulting solutions of the different dextran fractions are then further purified, e. g. by dialysis or ion exchange resin treatment, after which the dextran fractions can be recovered from the solutions by vacuum evaporation or equivalent means.

As indicated in Example I which follows, the fractionation of the completely precipitated dextran complexes is advantageously carried out by adding the acid in fixed portions and allowing the mixture to remain a short time, e. g., 10 minutes, to enable equilibrium to be attained, and then removing the residual precipitate by filtration or centrifuging. Solutions are thus obtained of the first and successive dextran fractions.

Another and different method of fractional separation is by selectively and fractionally precipitating alkaline earth hydroxide-dextran complexes from the solution containing dextrans by gradually increasing the amount of alkaline earth hydroxide available for the precipitation reaction.

I have found that when the amount of alkaline earth hydroxide added to or formed in the solution containing the dextrans is gradually increased, there is first precipitated an alkaline earth hydroxide complex of the lower molecular weight dextran fraction which can be separated from the solution; and that the addition of further amounts of alkaline earth hydroxide will effect a further fractional precipitation of the dextrans which can thus be obtained as successive fractions of dextrans of progressively increasing molecular weight in the complexes formed.

One advantageous method of carrying out this selective precipitation is by adding to the dextran solution the entire amount of alkaline earth metal in the form of a soluble salt and by then adding free alkali gradually and in successive amounts. The lowest molecular weight dextran is precipitated initially and, as the addition of alkali continues, the molecular weight of the dextran precipitated increases. Fractions of precipitate are removed either batchwise or continuously. The precipitates thus formed are acidified to remove the alkaline earth ions, thus giving solutions of the different dextran fractions, which are further purified as previously described.

Instead of adding all of the alkaline earth metal in the form of a soluble salt to the dextran solution, and adding the alkali gradually and in successive amounts; this procedure can be reversed by adding part or all of the alkali first and by adding a soluble alkaline earth metal salt gradually or in successive amounts.

Instead of adding all of the alkaline earth metal salt first and gradually adding the alkali; or adding all of the alkali first and gradually adding the soluble alkaline earth metal salt; the alkaline earth metal salt and the alkali can be added in successive amounts to effect the successive precipitation of the alkaline earth metal complexes of the different dextran fractions.

The precipitates formed by the fractional precipitation procedure above described can be acidified to set free the entire fraction from each precipitate, thus giving a dextran fraction corresponding to that in the precipitate. These fractions can, however, be further fractionated by subjecting the fractions of precipitated alkaline earth hydroxide-dextran complexes to further fractionation by selective acidification, as above described in connection with the fractionation of the totally precipitated dextran complexes.

The dextran fractions obtained in solution, after acidification of the dextran complexes, if the solutions are still at a high pH value of around 12 or higher, may still retain considerable alkaline earth ions in soluble coordination compounds, particularly where the acidification which is sufficient to render the dextran soluble is not sufficient to remove all of the alkaline earth ions present in the complex. To ensure complete removal of the metal content from the dextran, the solution may be treated with additional acid, particularly an acid which produces an insoluble alkaline earth salt. The pH value is advantageously reduced to around 2 to 8 and advantageously to a pH value of 6–7 to ensure maximum precipitation of the alkaline earth salt of the acid added.

The dextran fractions obtained in solution as above described are advantageously further purified by treatment with ion exchange resins to remove residual salt content. The solution may thus be treated by passage through a bed of cation exchange resin in the hydrogen exchange cycle and then through a bed of an anion exchange resin in the hydroxyl cycle. Examples of appropriate combinations of ion exchange resins are: (1) the strongly acidic cation exchange resin sold under the trade name Amberlite IR–120, followed by a weakly basic anion exchange resin such as the resin sold under the trade name Amberlite IR–45, or a strongly basic resin such as sold under the trade name Amberlite IRA–400; and (2) a strongly basic anion exchange resin such as Amberlite IRA–400 followed by a weakly acidic cation exchange resin such as Amberlite IRC–50, or a strongly acidic cation exchange resin such as Amberlite IR–120. The further purification of the dextran fraction can also be accomplished by a so-called "monobed" ion exchange resin system containing appropriate cation and anion exchange resins in a single column.

An alternative method of purification of the dextran solution to remove residual salt content is by subjecting the impure dextran solution to dialysis or electrodialysis in a semipermeable membrane system, whereby the salts and other low molecular weight impurities are removed.

The resulting purified solution can be concentrated to the desired dextran strength, sterilized and packaged for therapeutic use, or it can be prepared as a stable powder for re-suspension by sterilization and concentration to a heavy syrup which is spray dried or drum dried.

It is one advantage of the present process that the entire fractionation and recovery can be performed at ordinary temperatures of around 15 to 35° C. Although the dextran is relatively stable at the high pH values used, it is advisable to carry out the process at temperatures below 50° C.

Instead of purifying the dextran fractions to remove residual salts by ion exchange treatment or dialysis, the dextran fractions can be separated from the solutions by treatment with increasing amounts of water soluble organic solvent such as methyl, ethyl, isopropyl or propyl alcohol, acetone, or methyl ethyl ketone. The higher molecular weight dextran is precipitated initially and, as the solvent concentration is further increased, the molecular weight of the material precipitating decreases; and the successive fractions thus precipitated can be separately recovered. By this procedure, the partially degraded dextrans which have been initially fractionated as alkaline earth hydroxide complexes can be further fractionated by selective precipitation with the solvent. Such a fractional precipitation with an organic solvent accomplishes both a purification of the dextran by freeing it from soluble contaminants in solution, and a further fractionation of the dextran.

It is also possible to apply the solvent fractionation procedure to the demineralized fractionated dextran solutions, produced as above described, provided the solutions have not been completely deionized. I have found that when the partially hydrolyzed dextran fractions have been completely deionized by contact with ion exchange resins, they are not susceptible to precipitation by water soluble organic solvents such as alcohols or ketones; but when a small amount of electrolyte, such as sodium chloride, is added back to the dextran solution, it can be precipitated by the alcohol.

While I have described the fractionation of the partially hydrolyzed dextran by fractional precipitation of the alkaline earth hydroxide complexes and by fractional solution of the completely precipitated complexes; these two alternate processes can be combined to give a further fractional separation. Thus, each fraction which is formed by the partial and selective precipitation can be further fractionated by partial and selective acidification and further fractionation. Similarly, the solutions obtained by partial acidification of the completely precipitated dextran complexes can be further fractionated by fractional precipitation of the dextran from the solution. In this way, by combining the fractional solution and the fractional precipitation, or vice versa, fractions are obtainable having a narrow range of molecular weight and intrinsic viscosity.

The invention will be further illustrated by the following examples, but it will be understood that the invention is not limited thereto.

EXAMPLE I

This example illustrates the process in which the partially degraded dextrans are completely precipitated as lime-dextran complexes with fractionation by successive acid treatment of this precipitate.

Fifty parts of raw gum dextran isolated from the fermentation broth of L. mesenteroides cultured in a sucrose-yeast extract medium were dissolved in 1000 parts of 0.02 N hydrochloric acid. After heating 1 hr. at 90° C., the reaction mixture was cooled at 25° C. and neutralized to a pH value of 7 with 1 N caustic soda solution. The resulting solution of partially hydrolyzed dextran was diluted to 2000 parts with water.

56.8 parts of calcium chloride ($CaCl_2.2H_2O$) were dissolved in the dextran solution and 950 parts of 1 N caustic soda were added slowly with vigorous agitation (pH value 12.8). A voluminous white white precipitate of the calcium hydroxide-dextran complexes was obtained. The precipitate was centrifuged and resuspended in 1000 parts of saturated lime water. The precipitate from this washing operation was again recovered by centrifugation. The washed precipitate was suspended in water to make 1000 parts of slurry.

Fifty parts of 1 N sulphuric acid were then added slowly to the vigorously stirred suspension over a period of ten minutes and the mixture was allowed to come to equilibrium while stirring for 20 min. The reaction mixture was centrifuged and the centrifugate was separated for the recovery of the first dextran fraction.

The centrifugate was immediately neutralized to pH 6.5 with 1 N sulphuric acid and the precipitate of calcium sulfate was removed by filtration. The filtrate was treated with Amberlite IRC-50 in the acid regenerated H+ cycle and Amberlite IRA-400 in alkaline regenerated free base cycle until the conductivity of the solution was reduced below 80 micromhos. The resins were screened off and the filtrate was concentrated in vacuo and then dried as a thin layer in a shallow tray at 70° C. in a vacuum oven. The dextran dried into a thin translucent sheet which was pulverized and packaged. This product is referred to as fraction 1.

The residual precipitate of lime-dextran complexes from the first acidification was resuspended to 800 parts with water and the acidification with 50 parts of 1 N sulphuric acid was repeated to give a second fraction. The residual precipitate from the second fraction was resuspended to 600 parts with water and the acidification with 50 parts of 1 N sulphuric acid was repeated, giving the third fraction. The residual precipitate from the third acidification was resuspended to 500 parts with water and the acidification with 50 parts of 1 N sulphuric acid was repeated, giving the fourth fraction.

A fifth and sixth fraction was obtained by resuspending the residual precipitate to 400 and finally to 250 parts with water and similarly acidified to give a fifth and sixth fraction.

The quantity of dextran recovered in each fraction, in parts by weight, and the relative viscosity of each fraction as well as its intrinsic viscosity are tabulated in Table I, together with the pH value of the solution at which the extraction of the successive fractions took place. As indicated by this table, the fractional acidification of the completely precipitated dextran complexes gave dextran fractions of progressively lower intrinsic viscosity.

*Table I*

FRACTIONAL ACIDIFICATION OF LIME-DEXTRAN COMPLEX COMPOUNDS PREPARED FROM PARTIALLY HYDROLYZED DEXTRAN

| Fraction Number | pH | Parts by Weight | Percent of Total Dextran Recovered | Relative Viscosities (2% Sol. at 30° C.) | Intrinsic Viscosities (at 30° C.) |
|---|---|---|---|---|---|
| 1 | 12.6 | 4.3 | 11.1 | 1.92 | .312 |
| 2 | 12.5 | 9.3 | 23.8 | 1.82 | .298 |
| 3 | 12.2 | 6.8 | 17.4 | 1.80 | .292 |
| 4 | 12.4 | 7.2 | 18.6 | 1.79 | .236 |
| 5 | 12.2 | 6.6 | 17.1 | 1.78 | .231 |
| 6 | 12.1 | 4.2 | 10.8 | 1.77 | .276 |

EXAMPLE II

This example illustrates the fractional precipitation of the calcium hydroxide dextran complex from partially degraded dextran.

Fifty parts of raw dextran was hydrolyzed with 0.02 N hydrochloric acid as described in Example I. Calcium chloride (56.8 parts of $CaCl_2 \cdot 2H_2O$) was added to the neutralized hydrolyzate and then 1 N sodium hydroxide was added very slowly with vigorous agitation. After addition of each 150 parts of alkali solution the reaction mixture was centrifuged to recover a fraction of the calcium hydroxide-dextran complex precipitate. Addition of a similar amount of alkali to the centrifugate was then continued to recover an additional fraction. A total of 900 parts of alkali was added and six fractions were isolated.

Each fraction was treated with 1 N sulphuric acid to a pH value of 6.5 and the calcium sulfate was removed. Residual ions were removed as in Example I with a mixture of the ion exchange resins Amberlite IRC-50 and Amberlite IRA-400. The deionized filtrates were concentrated in vacuo and dried as a film in shallow trays.

The weights of dextran recovered in each fraction and their physical constants are summarized in Table II, together with the pH value of the solution from which they were precipitated as calcium hydroxide-dextran complexes.

*Table II*

FRACTIONAL PRECIPITATION OF CALCIUM HYDROXIDE-DEXTRAN COMPLEX COMPOUNDS PREPARED FROM PARTIALLY HYDROLYZED DEXTRAN

| Fraction Number | pH | Parts by Weight | Percent of Total Dextran Recovered | Relative Viscosities (2% Sol. at 30° C.) | Intrinsic Viscosities (at 30° C.) |
|---|---|---|---|---|---|
| 1 | 11.6 | 2.0 | 5.2 | 1.69 | 0.270 |
| 2 | 12.2 | 7.6 | 19.6 | 1.82 | 0.322 |
| 3 | 12.2 | 28.9 | 74.6 | 1.88 | 0.348 |
| 4 | 12.6 | 0.20 | 0.5 | | |
| 5 | 12.6 | traces | | | |
| 6 | 12.8 | traces | | | |

It is apparent that practically all the dextran recovered was in the first three fractions and that the dextran of minimum viscosity is precipitated initially as the calcium hydroxide-dextran complex and that as the additional of alkali continues precipitation of dextrans of progressively higher viscosity is obtained.

It is one of the advantages of the present invention that it obviates the use of volatile organic solvents for the precipitation or fractionation of dextrans and the risks of fire and explosion and the cost of processing large amounts of solvent.

It is a further advantage of the present invention that the physical nature of the products and intermediates obtained in the process is such that the materials are easily manageable in all phases, as distinguished from the viscous, slimy products obtainable by solvent fractionation.

The improved process of the present invention is advantageously combined with the process of recovering dextran described in my prior application Serial 201,497. When the dextran is produced by fermentation of sucrose solutions, and the fermentation product is further fermented with yeast to remove the fructose, and the dextran then precipitated as an alkaline earth metal hydroxide-dextran complex, and the dextran is set free from such complex by treatment of an aqueous suspension with an acid which forms an insoluble alkaline earth metal salt, a dextran solution is obtained which can advantageously be used as the raw dextran to be hydrolyzed and fractionated.

This combined process has the advantage that it enables the fractions of hydrolyzed dextran to be produced without isolating the raw dextran as a solid product and without the use of organic solvents at any stage of the process from that in which the sucrose is fermented up to the final separation of the fractions of hydrolyzed dextran. Instead of isolating the dextran by the use of alcohol as an intermediate product, the solutions obtained by the treatment of the alkaline earth metal hydroxide-dextran complexes with acid are used directly as the solutions of dextran to be hydrolyzed and subsequently fractionated.

This process is illustrated by the following example which includes the fermentation of the sucrose solution and the production of the solution to be hydrolyzed.

EXAMPLE III

A culture of *L. mesenteroides* is grown in an appropriate fermentation medium containing 10% sucrose, yeast extract and inorganic nutrient. After 26 hours growth whereupon the majority of the sucrose has been converted to dextran and fructose, the medium is inoculated with an active yeast culture (*S. cerevisiae*, 3% by volume). After an additional 36 hours of fermentation, the fructose and residual sugars have been removed by the yeast, leaving the dextran in the fermentation beer which is free from sugars.

The resulting fermentation beer is treated with calcium chloride using 1600 grams of calcium chloride ($CaCl_2.2H_2O$) for 32 liters of fermentation beer; and the pH of the solution is adjusted to a value of 8.0 with lime. The mixture is then supercentrifuged to remove bacterial and yeast cells and other impurities including some calcium salts and proteinaceous substances.

The clarified solution is diluted with an equal volume of water. A 5 N sodium hydroxide solution (4.6 liters) is added slowly with vigorous agitation. The reaction mixture is centrifuged in a solid bowl centrifuge and the voluminous white precipitate of calcium hydroxide-dextran complex is resuspended in 30 liters of saturated lime water. After another centrifugation the washed precipitate so obtained is resuspended in 32 liters of water. Carbon dioxide is then bubbled into the suspension until a pH value of 8.5 is attained. This results in decomposition of the calcium hydroxide complexes, precipitation of calcium carbonate, and the formation of a solution of the dextran. After filtration to remove the calcium carbonate, the dextran solution is obtained in a form which can be directly used for hydrolysis with acid. This solution is then used as the raw material in the processes illustrated in Examples I and II.

It will be seen that the present invention is based upon the formation and precipitation of alkaline earth hydroxide complexes of partially degraded dextran, and the difference in stability and solubility of such complexes at various pH values and alkaline earth metal ion concentrations. Whether the dextran complexes are completely precipitated and fractionally dissolved by acid treatment, or whether the complexes are fractionally precipitated, the process is one in which there is produced a mixture containing part of the dextrans in the form of insoluble complexes and part of the dextrans in solution, so that the dextrans in solution can be separated from those precipitated in the form of insoluble complexes.

I claim:

1. The method of effecting the fractional separation of mixtures of dextrans of various molecular sizes which comprises reacting a solution containing such dextrans as its principal constituents, and which solution is free from sugar, with an alkaline earth hydroxide and forming an aqueous reaction mixture containing part of the dextrans as insoluble alkaline earth hydroxide complexes and part of the dextrans in solution, and separating the solution from the insoluble complexes.

2. The method according to claim 1 in which the solution of dextrans is reacted with an alkaline earth metal hydroxide in amount sufficient to precipitate substantially all of the dextrans as insoluble alkaline earth hydroxide complexes, and the resulting precipitate is treated in aqueous suspension with a limited amount of acid to convert part of the complexes into a soluble form.

3. The method according to claim 1, in which the solution of dextrans is treated with a limited amount of an alkaline earth hydroxide sufficient to precipitate a part only of the dextrans as insoluble complexes.

4. The method of treating solutions of partially hydrolyzed dextrans which comprises reacting solutions containing such partially hydrolyzed dextrans as their principal constituents, and which solutions are free from sugar, with an alkaline earth metal hydroxide in amount sufficient to precipitate at least part of the dextrans as insoluble alkaline earth hydroxide dextran complexes.

5. The method according to claim 4 in which the amount of alkaline earth metal hydroxide reacted with the solution is sufficient to precipitate substantially all of the dextrans as insoluble alkaline earth hydroxide-dextran complexes, and in which the complexes are treated with an amount of acid sufficient to convert at least part of the complexes from an insoluble to a soluble form.

6. The method according to claim 4, in which the amount of alkaline earth metal hydroxide reacted with the solution is insufficient to convert all of the dextrans into insoluble complexes.

7. The method of effecting the fractional separation of partially hydrolyzed dextrans which comprises reacting a solution of such partially hydrolyzed dextrans with an amount of alkaline earth metal hydroxide sufficient to precipitate substantially all of the dextrans as insoluble alkaline earth metal hydroxide-dextran complexes, and treating the precipitate successively with amounts of acid sufficient to convert part of the complexes into soluble dextran, and separating the successive solutions so formed from the remaining insoluble complexes.

8. The method according to claim 7 in which the acid used for the treatment of the complexes is an acid forming an insoluble alkaline earth metal salt.

9. The method according to claim 7 in which the precipitated dextran complexes are washed with saturated lime water to remove impurities prior to treatment with the acid.

10. The method according to claim 7 in which the solutions formed by the successive treatments with acid are further acidified with an amount of acid sufficient to combine with all of the alkaline earth metal and in which the dextran is then separated from the solution.

11. The method according to claim 7, in which the acid used for the treatment of the complexes is an acid forming an insoluble alkaline earth salt and in which a further amount of such acid is added to the solutions to effect substantially complete precipitation of the alkaline earth metal as insoluble salts in which the dextran is then separated from the solution.

12. The method of treating solutions of partially hydrolyzed dextrans which comprises reacting such solutions with an alkaline earth metal hydroxide in amount sufficient to precipitate part of the dextrans as insoluble alkaline earth hydroxide-dextran complexes following which the portion of the dextran alkaline earth hydroxide complex thus removed is treated successively with amounts of acid sufficient to convert successive parts of the complex fraction into soluble dextran and thus effect further fractionation.

13. The method of effecting the fractional separation of partially hydrolyzed dextrans which comprises adding to a solution of the partially hydrolyzed dextrans an amount of alkaline earth metal hydroxide sufficient to effect partial precipitation of the dextrans as insoluble alkaline earth hydroxide complexes, separating the precipitate from the remaining solution, and further treating the solution with additional alkaline earth metal hydroxide to effect a further fractional precipitation of dextrans as insoluble alkaline earth hydroxide complexes.

14. The method according to claim 12, in which the fractional precipitates are treated with acid to set free the dextran and form alkaline earth metal salts of the acid and in which the acid used forms an insoluble precipitate with the alkaline earth metal.

15. The method of producing and effecting the fractional separation of partially hydrolyzed dextrans which comprises adding to a dextran-containing fermented culture medium an alkaline earth metal hydroxide to precipitate the dextran as an insoluble addition complex, treating the resulting complex in aqueous suspension with an acid forming an insoluble alkaline earth metal salt, thereby producing an aqueous solution of the dextran, subjecting such solution to partial hydrolysis and reacting the resulting solution with alkaline earth metal hydroxide and forming an aqueous reaction mixture containing part of the partial hydrolyzed dextran as insoluble alkaline earth hydroxide-dextran complexes and part of the dextrans in solution, and separating the solution from the insoluble complexes.

16. The method according to claim 15 in which the solution of partially hydrolyzed dextran is reacted with an alkaline earth metal hydroxide in amount sufficient to precipitate substantially all of the dextrans as insoluble alkaline earth hydroxide-dextran complexes, and the resulting precipitate is treated in aqueous suspension with a limited amount of acid to convert part of the complexes into a soluble form.

17. The method according to claim 15 in which the solution of partially hydrolyzed dextran is treated with a limited amount of alkaline earth hydroxide sufficient to precipitate a part only of the dextrans as insoluble complexes.

References Cited in the file of this patent

UNITED STATES PATENTS

| Number | Name | Date |
|---|---|---|
| 2,565,507 | Lockwood et al. | Aug. 28, 1951 |

OTHER REFERENCES

Bull et al.: Lancet, pages 135–7 (January 22, 1949).

Renfrew et al.: Jour. Amer. Phar. Assoc., pages 177–9, vol. 38, April 1949.

Gronwall et al.: Nature, January 13, 1945, page 45.

Gortner: Outlines of Biochemistry, 1949, page 671.